(12) United States Patent
Metral

(10) Patent No.: US 10,122,813 B2
(45) Date of Patent: *Nov. 6, 2018

(54) PROXIED PUSH NOTIFICATION BASED ON USER INTERACTION

(71) Applicant: PayPal, Inc., San Jose, CA (US)

(72) Inventor: Max Edward Metral, Brookline, MA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,926

(22) Filed: Sep. 18, 2017

(65) Prior Publication Data
US 2018/0069940 A1 Mar. 8, 2018

Related U.S. Application Data

(63) Continuation of application No. 15/197,569, filed on Jun. 29, 2016, now Pat. No. 9,769,272, which is a
(Continued)

(51) Int. Cl.
| | |
|---|---|
| G06F 15/16 | (2006.01) |
| H04L 29/08 | (2006.01) |
| G06Q 30/04 | (2012.01) |
| G06Q 30/02 | (2012.01) |
| H04W 4/02 | (2018.01) |
| H04W 4/12 | (2009.01) |

(52) U.S. Cl.
CPC ......... *H04L 67/26* (2013.01); *G06Q 30/0261* (2013.01); *G06Q 30/04* (2013.01); *H04L 67/025* (2013.01); *H04L 67/04* (2013.01); *H04L 67/18* (2013.01); *H04W 4/02* (2013.01); *H04W 4/12* (2013.01); *G06Q 30/0267* (2013.01)

(58) Field of Classification Search
None
See application file for complete search history.

(56) References Cited

U.S. PATENT DOCUMENTS

| | | | | |
|---|---|---|---|---|
| 5,311,572 | A * | 5/1994 | Friedes | H04M 15/00 379/211.02 |
| 6,011,969 | A * | 1/2000 | Vargas | H04W 76/20 455/423 |

(Continued)

FOREIGN PATENT DOCUMENTS

WO 2015/102889 A1 7/2015

*Primary Examiner* — Peling Shaw
(74) *Attorney, Agent, or Firm* — Haynes and Boone, LLP

(57) ABSTRACT

Systems and methods are provided that allow a proprietor of a location or merchant to which a user is interacting through a third party to send a push notification to a user device associated with the user using the third party as a proxy. The provided systems and methods may assign an interaction identifier to the user and interaction when an interaction request is received by the third party that may be later used to identify the user and user device to which a notification received from the proprietor or merchant will be pushed. The user may be able to define rules and settings that limit the scope and timing of the push notifications that can be received, and the third party may determine if notifications received from the proprietor or merchant meet these rules and settings before pushing the notifications to the user device and user.

20 Claims, 7 Drawing Sheets

Related U.S. Application Data continuation of application No. 14/146,531, filed on Jan. 2, 2014, now Pat. No. 9,407,705.

(56) References Cited

U.S. PATENT DOCUMENTS

| | | |
|---|---|---|
| 2002/0083013 A1 | 6/2002 | Rollins et al. |
| 2005/0055422 A1* | 3/2005 | Campbell .............. G06Q 30/04 709/217 |
| 2008/0261526 A1* | 10/2008 | Suresh .................. G06Q 30/02 455/41.2 |
| 2009/0157834 A1 | 6/2009 | Krishnaswamy |
| 2013/0084896 A1 | 4/2013 | Barkie et al. |
| 2013/0263211 A1* | 10/2013 | Neuman ................ H04L 63/08 726/1 |

\* cited by examiner

PROXIED PUSH NOTIFICATION BASED ON USER INTERACTION

CROSS REFERENCE TO RELATED APPLICATIONS

This application is a continuation of U.S. patent application Ser. No. 15/197,569 filed on Jun. 29, 2016(now U.S. Pat. No. 9,769,272, issued on Sep. 19, 2017), which is a continuation of the U.S. patent application Ser. No. 14/146,531 filed on Jan. 2, 2014 (now U.S. Pat. No. 9,407,705, issued on Aug. 2, 2016), which are hereby incorporated by reference herein in their entirety.

BACKGROUND

Technical Field

Embodiments disclosed herein are related to push notifications on mobile devices. In particular, embodiments disclosed herein may allow a merchant or location to use a user's interaction with the merchant or location via a third party as a proxy to send push notification to the user's mobile device.

Related Art

Due to the increase in use of mobile devices and the improved networking and online capabilities of these mobile devices, merchants having physical "brick and mortar" storefronts may also have an online presence to enhance a user's experience while at the physical storefront. Users may be able to interact with the merchant or location via a third party that facilitates the interaction. The interaction may include offline and online interactions, such as performing online transactions, checking in to receive advertisements, specials, and other information, and the like. For example, a third party such as PayPal, Inc. of San Jose, Calif., may facilitate user interaction with the merchant or location by providing options for selecting, ordering, and paying for items, providing convenience for both the user and the merchant. Additional interactions may be facilitated by other third parties or the same third party, and may include sending advertisements, specials, offers, and the like. While the third party may be able to provide information to the user based on an interaction, the merchant or location may be limited to providing information to users via an e-mail, short messaging service (SMS) message, or voice call, all of which require the user to provide personal information to the merchant or location. Certain mobile operating systems allow for third parties to push notifications to a user's mobile device. However, these operating systems require that a specific application or "app" be first installed on the user's mobile device before allowing for push notifications. Since installing an app for each location or merchant that a user may visit may be time consuming and tedious, locations or merchants may not be able to conveniently send information to the users and, thus, may not be able to fully benefit from interactions facilitated by the third party.

Figure 1:
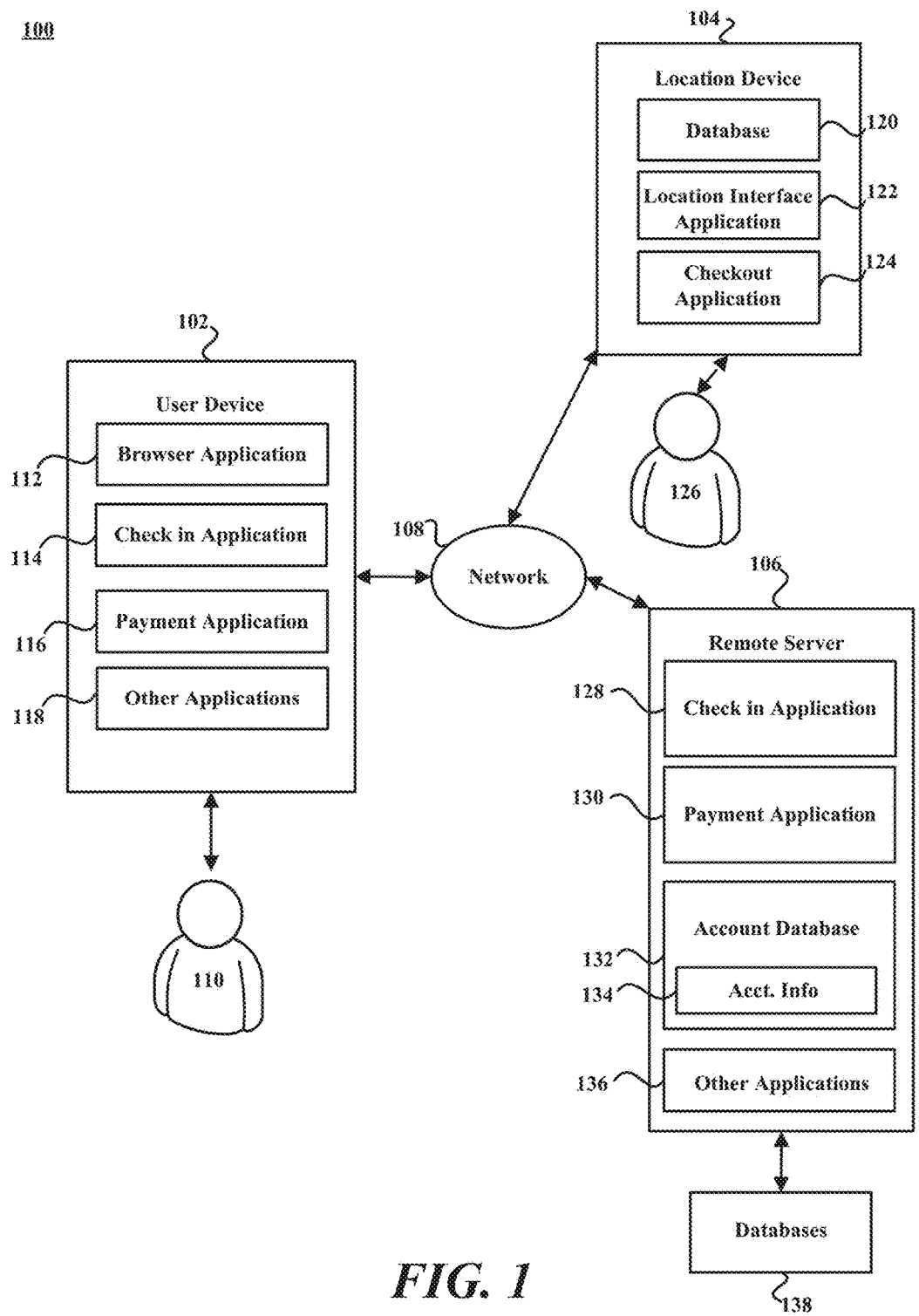
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

What is needed are systems and methods for allowing a location or merchant to be able to provide information and content to a user that is interacting with the location or merchant through a third party without requiring the user to provide personal contact information to the location or merchant or requiring the user to install location or merchant-specific software.

Consistent with some embodiments, there is provided a system. The system includes a network interface component configured to receive an interaction request from a user for an interaction with a location through the system, receive a notification to provide to the user, the notification including an interaction identifier, and push the notification to a user device associated with the interaction identifier. The system also includes one or more processors configured to process the interaction request, assign the interaction identifier to the user, and look up the user device using the received interaction identifier, the identifier specifying the user device to which the notification is to be pushed. The system further comprises a memory storing the interaction identifier.

Consistent with some embodiments, there is also provided a method. The method includes steps of processing a request from a user to interact with a location, assigning an interaction identifier to the user, providing the location with information related to the user and the interaction, and pushing a notification received from the location to the user using the assigned interaction identifier. The method may be embodied in computer-readable media.

Consistent with some embodiments, there is further provided a method. The method includes steps of receiving interaction information from a remote server, the interaction information indicating that a user is interacting with a location associated with the one or more processors through the remote server, generating a notification to be sent to the user, and sending the notification to the remote server to push to a user device associated with the user. The method may be embodied in computer-readable media.

Embodiments described herein may allow a merchant or location to send notifications to a device of a user interacting with the merchant or location through a third party through one or more applications installed on the user device that are associated with the third party and used for the interaction. In particular, embodiments described herein may assign the user and/or user device and the interaction a specific interaction identifier that may be used by the third party to send certain notifications on behalf of the merchant or location to the user or user device.

FIG. 1 is a block diagram of a networked system 100, consistent with some embodiments. System 100 includes a user device 102, a location or merchant device 104 (location and merchant may be used interchangeably herein, with location being general and merchant being a specific type of location at which a user can also interact with to conduct transactions for goods and services), and a remote server 106 in communication over a network 108. Remote server 106 may be a payment service provider server that may be maintained by a payment service provider, such as PayPal, Inc. of San Jose, Calif. Remote server 106 may be maintained by other service providers in different embodiments. Remote server 106 may also be maintained by an entity with which sensitive credentials and information may be exchanged with user device 102. Remote server 106 may further be one or more servers that hosts functionality for users to "check in" to a location, merchant, event, and the like. Checking in may provide the user that checks in with special offers, deals, and the like, and may let the merchant or other proprietor of the location or event know that the user is there. The user may also check in to a location for social purposes to let friends and contacts of the user know that they have checked in. Remote server 106 may be more generally a web site, an online content manager, a service provider, such as a bank, or other entity who provides content to a user requiring user authentication or login. In general, remote server 106 may be a single server or a collection of servers that acts as a third party facilitator for a user 110 to interact with a location or merchant. Moreover, as used herein, an "interaction" may be a request to a third party such as remote server 106 to create a relationship between a location or merchant and user 110 for purposes including transaction, offers, payments, subscriptions, check in, and the like.

Network 108, in one embodiment, may be implemented as a single network or a combination of multiple networks. For example, in various embodiments, network 108 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

User device 102, in one embodiment, may be implemented using any appropriate combination of hardware and/or software configured for wired and/or wireless communication over network 108. For example, user device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

User device 102 may include any appropriate combination of hardware and/or software having one or more processors and capable of reading instructions stored on a tangible non-transitory machine-readable medium for execution by the one or more processors. Consistent with some embodiments, user device 102 includes a machine-readable medium, such as a memory (not shown) that includes instructions for execution by one or more processors (not shown) for causing user device 102 to perform specific tasks. In some embodiments, the instructions may be executed by the one or more processors in response to interaction by user 110. For example, such instructions may include browser application 112 such as a mobile browser application, which may be used to provide a user interface to permit user 110 to browse information available over network 108, including information hosted by remote server 106. For example, browser application 112 may be implemented as a web browser to view information available over network 108. Browser application 112 may include a graphical user interface (GUI) that is configured to allow user 110 to interface and communicate with remote server 106 or other servers managed by content providers or merchants via network 108. For example, user 110 may be able to access websites to find and purchase items, as well as access user account information or web content using browser application 112. As another example, user 110 may be able to interact with a merchant or location through remoter server 104 using browser application 112.

User device 102 may also include a check in application 114 that may allow user 110 to interact with a location or merchant through remote server 104 by checking in to the location or merchant using a check in platform or service such as may be provided by PayPal, Inc. of San Jose, Calif., Foursquare of New York, N.Y., Facebook, Inc., of Menlo Park, Calif., Yelp, Inc., of San Francisco, Calif., or Google+ of Google, Inc. of Mountain View, Calif., and implemented by remote server 106. In some embodiments, check in application 114 may include multiple application programming interfaces (APIs) for checking in to one or more of the check in platforms or services. In some embodiments, checking in to a location or merchant while visiting a location or merchant may allow user 110 to interact with the merchant or location by providing user 110 with exclusive deals or offers, or may allow user 110 to interact with the merchant or location by allowing user 110 to conduct transactions with the merchant or location, such as purchasing and paying for items.

User device 102 may also include a payment application 116 that may be used by user 110 using user device 102 to interact with a merchant or location by making a payment. In some embodiments, the interaction provided by payment application 116 may be facilitated by remote server 106 as a payment processor. In some embodiments, functionalities and interactions provided by check in application 114 and payment application 116 may actually be provided by a single application. User device 102 may include other applications 118 as may be desired in one or more embodiments to provide additional features available to user 110, including accessing a user account with remote server 106. For example, applications 118 may include interfaces and communication protocols that allow the user to receive and transmit information through network 108 and to remote server 106 and other online sites. Applications 118 may also include security applications for implementing client-side security features, programmatic client applications for interfacing with appropriate APIs over network 108 or various other types of generally known programs and/or applications. Applications 118 may include mobile applications downloaded and resident on user device 102 that enables user 110 to access content through the applications.

Location device 104 may be implemented using any appropriate combination of hardware and/or software configured for wired and/or wireless communication over network 108. Location device 104 may include any appropriate combination of hardware and/or software having one or more processors and capable of reading instructions stored on a tangible non-transitory machine-readable medium for execution by the one or more processors. Consistent with some embodiments, location device 104 includes a machine-readable medium, such as a memory (not shown) that includes instructions for execution by one or more processors (not shown) for causing location device 104 to perform specific tasks. In some embodiments, the instructions may be executed by the one or more processors in response to a proprietor of a location. Further, location device 104 may be a device such as a point-of-sale (POS) device, a server associated with a location, and a combination thereof.

Location device 104 may include a database 120 identifying available items which may be made available for viewing and purchase by user 110. Database 120 may include descriptions, images, and pricing of the items. Location device 104 may also include a location interface application 122 which may be configured to serve information over network 108 to browser application 112, check in application 114, and/or payment application 116 of user device 102 though network 108 and/or via remote server 106. In some embodiments, user 110 may interact with the merchant or location via remote server 106 through browser application 112, check in application 114, and/or payment application 116 over network 108 in order to view various products, food items, or services identified in database 118, such that a user of location device 104 may be capable of monitoring such interaction through location interface application 122. In some embodiments, location interface application 122 may allow a user of location device 104 to monitor and interact with users, such as user 110, based on transactions that user 110 has performed with the location or merchant via remote server 106, or based on a user check in at the location via remote server 106. For example, location interface application 122 may show information about user 110, such as if user 110 has checked into the location, if user 110 has purchased an item, or if user 110 has ordered an item for pick up at the location. In some embodiments, location interface application 122 may allow a user 126 of location device 104 to send one or more push notifications to user device 102 using remote server 106 as a proxy. In particular, when user 110 interacts with a location through remote server 106 using check in application 114 or payment application 116, the check in or payment may be processed by remote server 104, and user 110 may provide permission to remote server 106 as part of the check in or payment to receive messages from remote server 104. Consequently, location interface application 122 may allow user 126 to send a notification to remote server 104, which may then push the notification to check in application 114 and/or payment application 116 of user device 102, as is described herein in greater detail.

Location device 104 may also include a checkout application 124 which may be configured to facilitate the purchase by user 110 of goods or services (referred to collectively as "items") identified by location interface application 122. Checkout application 124 may be configured to accept payment information from or on behalf of user 110 through remote server 106 over network 108. For example, checkout application 124 may receive and process a payment confirmation from remote server 106, as well as transmit transaction information to remote server 106 and receive information from remote 106. Checkout application 124 may also be configured to accept one or more different funding sources for payment including payments processed by remote server 106. In some embodiments, user 126 may use location interface application 122 in concert with checkout application 124 to interact with user 110 through remote server 106 to facilitate the transaction of items.

Although applications 112-118 in user device 102 and applications 120-124 in location device 104 describe specific functionalities provided and facilitated by each separate application, in some embodiments, one or more of the functionalities provided by the separate applications may be provided by a single application. For example, the functionalities provided by check in application 114 and payment application 116 may be provided by a single application. Similarly, the functionalities of location interface application 122 and checkout application 124 may be provided by a single application. In some embodiments, the single application capable of providing such functionalities on user device 102 and location device 104 may be provided by PayPal, Inc., of San Jose, Calif.

Remote server 106, according to some embodiments, may be maintained by an online payment provider, such as PayPal, Inc. of San Jose, Calif., which may provide processing for online financial and information transactions on behalf of user 110. Remote server 106, according to some embodiments, may also be maintained by a service that processes check ins so that user 126 or others know that user 110 is at the location. Remote server 106 may include at least check in application 128, which may be configured to facilitate a user interaction with a location to check user 110 in to a location, and then provide user check in information to location device 104. In some embodiments, checking user device 102 in to a location may allow user 110 and user device 102, to access features, specials, offers, and the like offered by the location. In some embodiments, these features, specials, offers, and the like may be provided and processed by remote server 106 on behalf of the location.

Remote server 106 may also include a payment application 130 that may allow user 110 to interact with a location or merchant by processing payments for user 110 to the location or merchant. In some embodiments, payment application 130 may be configured to interface with payment application 116 and/or checkout application 124 to receive payment details, user information, merchant/location information, and additional information for processing a payment on behalf of user 110. Payment application 130 may also be capable of interfacing with check in application 128 such that when a check in is processed a payment may be authorized for the location in which user 110 is checking in to. In some embodiments, functionalities provided by check in application 128 and payment application 130 may actually be provided by a single application. Remote server 106 may also include an account database 132 that includes account information 134 for users having an account on remote server 106, such as user 110. In some embodiments, payment application 130 may process payments based on information in account information 134 of account database 132. Moreover, check ins received from user device 102 may also be processed based on information in account information 134 of account database 132. Certain user information stored in account information 134 may also be provided to location device 104 when user 110 interacts with a location via remote server 106. Furthermore, account information 134 may include one or more personal preferences, settings, and rules, that are set by user 110 describing rules for receiving notifications from remote server 106 that will be pushed by check in application 114 or payment application 116. Remote server 106 may include other applications 136 and may also be in communication with one or more external databases 138, that may provide additional information that may be used by remote server 106. In some embodiments, databases 138 may be databases maintained by third parties, and may include third party account information of user 110.

Although discussion has been made of applications and applications on user device 102, location device 104, and remote server 106, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications.

Figure 2:
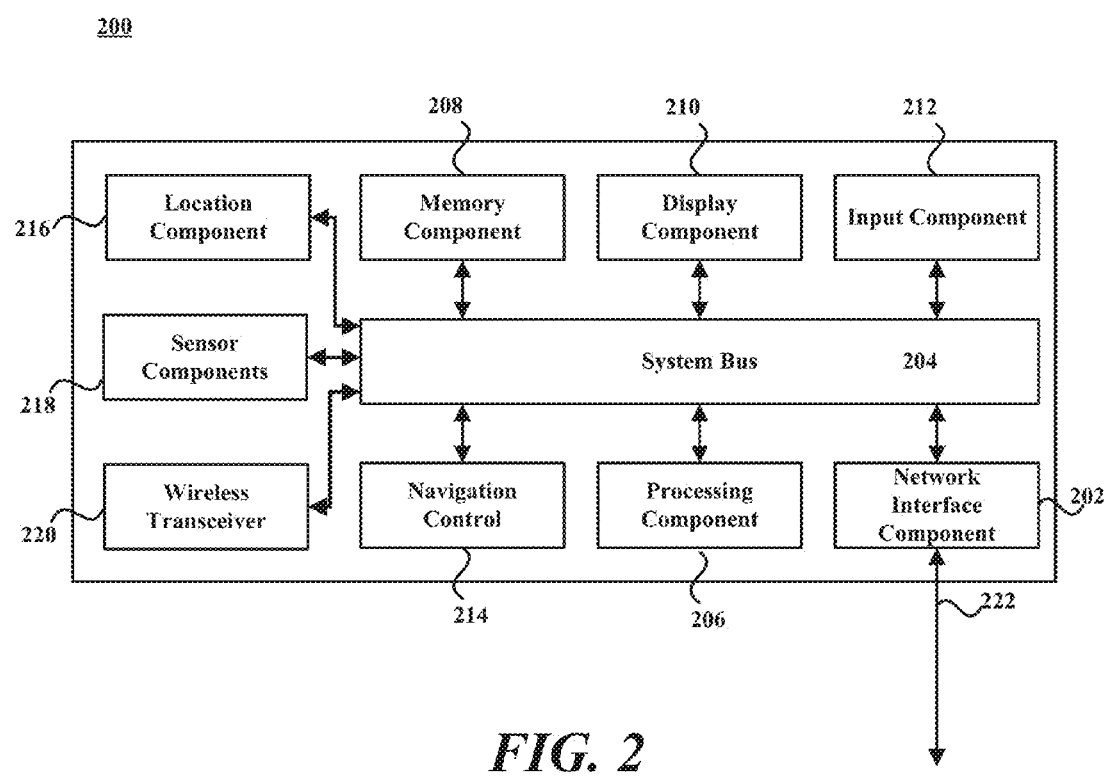
FIG. 2 is a diagram illustrating a computing system, consistent with some embodiments.

FIG. 2 is a diagram illustrating computing system 200, which may correspond to any of user device 102, location device 104, or remote server 106, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with user device 102 or location device 104. Further, computing system 200 may also be a server or one server amongst a plurality of servers, as would be consistent with remote server 106. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs), and a memory component 208, which may correspond to a random access memory (RAM), an internal memory component, a read-only memory (ROM), or an external or static optical, magnetic, or solid-state memory. Consistent with some embodiments, computing system 200 further includes a display component 210 for displaying information to a user of computing system 200, such as user 110 or user 126. Display component 210 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 212, allowing for a user of computing system 200, such as user 110 or user 126, to input information to computing system 200. Such information could include payment information such as an amount required to complete a transaction, account information, authentication information such as a credential, or identification information. An input component 212 may include, for example, a keyboard or key pad, whether physical or virtual. Computing system 200 may further include a navigation control component 214, configured to allow a user to navigate along display component 210. Consistent with some embodiments, navigation control component 214 may be a mouse, a trackball, or other such device. Moreover, if device 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include sensor components 218. Sensor components 218 provide sensor functionality, and may correspond to sensors built into user device 102 or sensor peripherals coupled to user device 102. Sensor components 218 may include any sensory device that captures information related to user 110 and/or user device 102 that may be associated with any actions that user 110 performs using user device 102. Sensor components 218 may include camera and imaging components, accelerometers, biometric readers, GPS devices, motion capture devices, and other devices that are capable of providing information about user device 102 or user 110, or an environment therearound. Computing system 200 may also include one or more wireless transceivers 220 that may each include an antenna that is separable or integral and is capable of transmitting and receiving information according to one or more wireless network protocols, such as Wi-Fi™, 3G, 4G, HSDPA, LTE, RF, NFC, IEEE 802.11a, b, g, n, ac, or ad, Bluetooth®, BLE, WiMAX, ZigBee®, etc.

Computing system 200 may perform specific operations by processing component 206 executing one or more sequences of instructions contained memory component 208. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 222 and network interface component 202 and wireless transceiver 220. Received program code may be executed by processing component 206 as received and/or stored in memory component 208.

Figure 3:
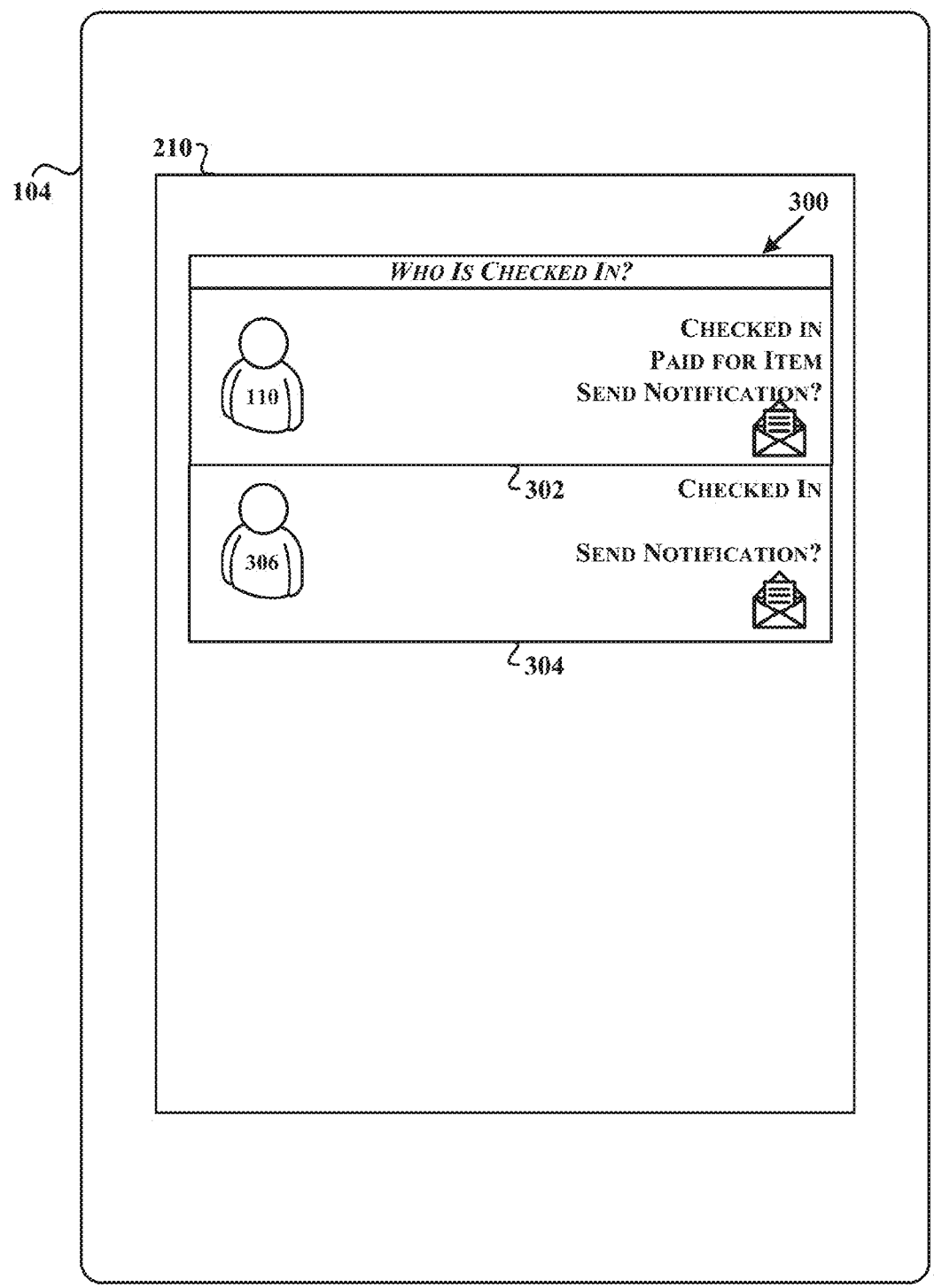
FIG. 3 is an illustration of an example interface provided by a check in or payment application of a location device, consistent with some embodiments.

FIG. 3 is an illustration of an example interface 300 provided by location interface application 122, on a display component 210 of location device 104, consistent with some embodiments. As shown in FIG. 3, interface 300 includes entries 302 and 304 for user 110 and user 306 that are currently interacting with the location. In some embodiments, interface 300 may only provide entries for users that are interacting with the location via remote server 106. Other interactions via other servers may have other interfaces accordingly.

As shown in FIG. 3, entry 302 may include a photo of user 110, as well as interaction information related to interactions user 110 may be engaging in with the location via remote server 106, including that user 110 is currently checked in and has paid for an item. If user 110 had ordered an item ahead of time, the contents and details of the order may be included in entry 302 so that user 126 may be able to prepare the order for user 110 and present it to user 110 when user 110 arrives at the location based on the photo of user 110. As shown in FIG. 3, entry 304 may include a photo of user 306 along with interaction information, such that user 306 has only checked into the location. Additional interaction information or personal information may be presented in entries 302 and 304, such as provided by remote server 106 in accordance with permissions set by user 110 and 306. In some embodiments, entries 302 and 304 may be displayed based on information received from remote server 106 concerning an interaction facilitated by remote server 106. Such received information may include an interaction identifier that may include some or all of the information displayed in entries 302 and 304 and may be mapped to the user and the interaction on remoter server 106. Interface 300 may also allow user 126 to send a notification to an interacting user, such as user 110 or user 306. In some embodiments, interface 300 may provide the ability to send a notification in each entry 302 and 304, such as shown in FIG. 3. In other embodiments, a single send notification button, check box, and the like may be provided in interface 300 so that user 126 can select an entry 302 or 304 and the select the button to send a notification. In accordance with some embodiments, the notifications may be sent to the checked in user using remote server 106 as a proxy.

Figure 4:
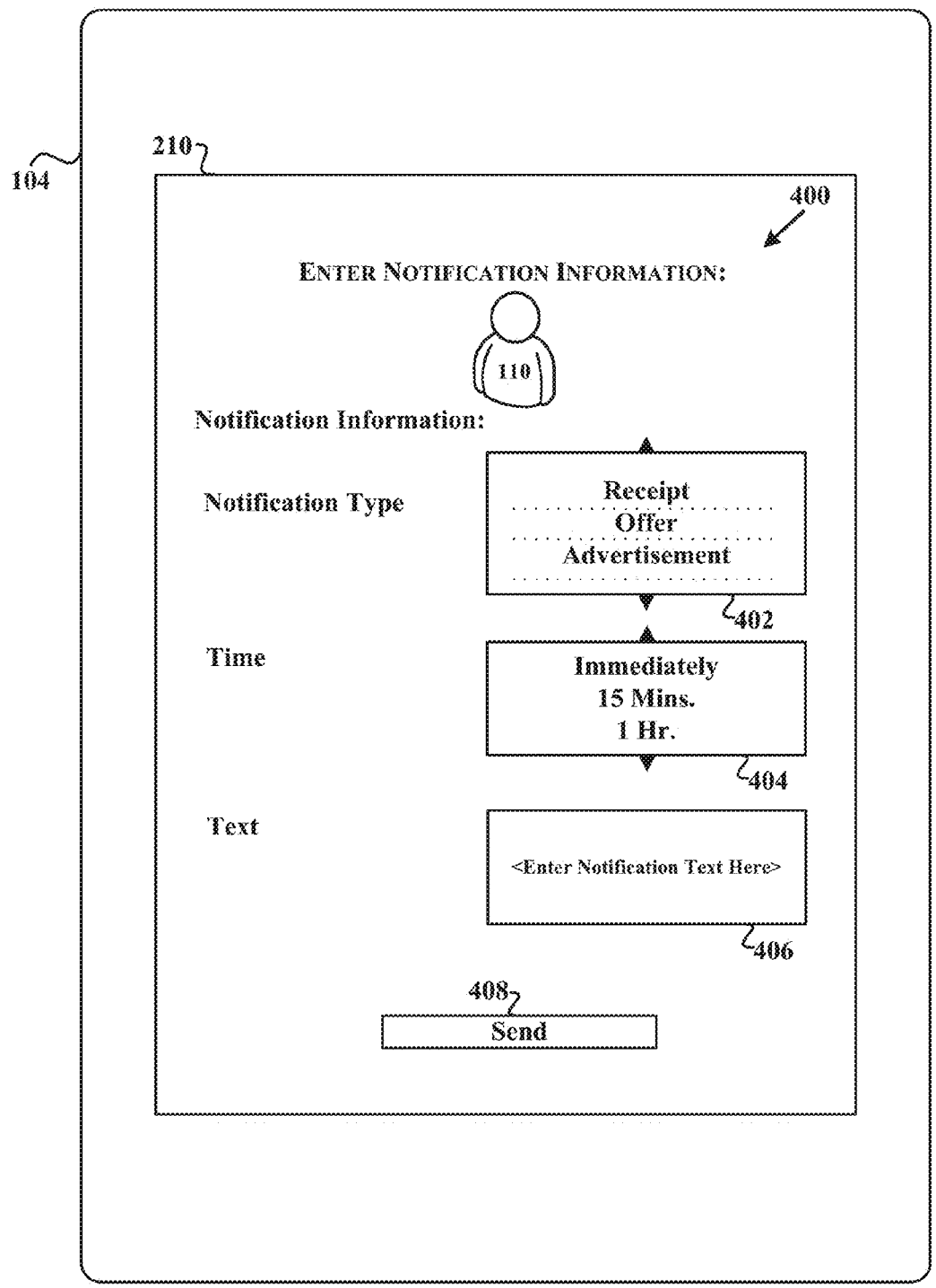
FIG. 4 is an illustration of an example interface provided by a check in or payment application for sending a notification to a user, consistent with some embodiments.

FIG. 4 is an illustration of an example interface 400 provided by location interface application 122 for sending a notification to an interacting user, consistent with some embodiments. If a user 126 wants to send a notification to an interacting user displayed in interface 300, user 126 may be presented with interface 400. As shown in FIG. 4, interface 400 provides user 126 with options for creating the notification to be sent to a selected user which, as shown in FIG. 4, is user 110. The options may include a notification type 402, a time for delivery 404, and a text box 406. In some embodiments, the notification type and time may be drop down boxes or scroll wheels, as shown in FIG. 4, but may also be presented in other ways. Similarly, text box 406 may be replaced with predetermined messages and the like. Notification type 402, time 404, and text box 406 are examples of some options that may be included in a notification. Other options not shown in FIG. 4 or described herein may be included and are considered to be within the scope of this disclosure. Once user 126 has created a notification with the content and options of their choosing, user 126 may select the send button 408 which will cause one or more data packets including the notification content as well as an interaction identifier 110 to remote server 106 for sending to user device 102.

Figure 5:
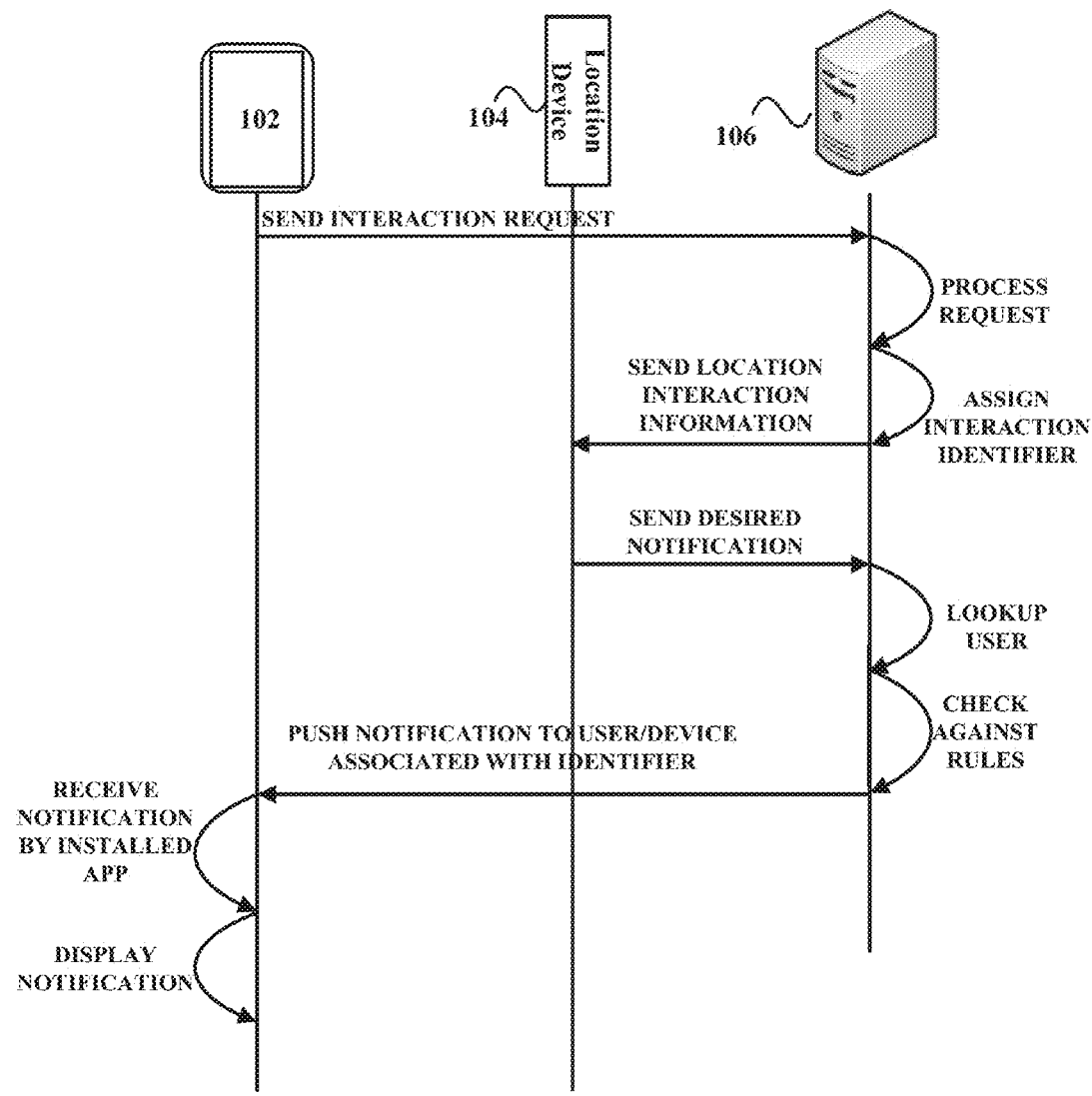
FIG. 5 is a diagram illustrating a flow for sending a notification to a user device using remote server interaction as a proxy, consistent with some embodiments.

FIG. 5 is a diagram illustrating a flow for sending a notification to a user device using remote server 106 as a proxy, consistent with some embodiments. As shown in FIG. 5, when user device 102 interacts with a merchant or location through remote server 106, user may first send a request to remote server 106, and remote server 106 may process the request and assign an interaction identifier to the user and interaction. In some embodiments, the interaction identifier may be mapped to user 110, device 102, and may provide information about the interaction, such as whether it is a transaction, a check in, or a combination thereof. In some embodiments, the request may be sent by a beacon, such as a Bluetooth® or BLE beacon, or an NFC beacon. Moreover, the interaction identifier may be associated with and/or mapped to user 110 and/or user device 102 in account information 134 corresponding to user 102.

Remote server 106 may then send interaction information to location device 104. The interaction information may include information about user 110, such as a photo of user, a user ID, personal information such as name, details related to the interaction with the location facilitated and processed by remote server 104. The interaction information may also include the assigned interaction identifier. Location interface application 122 executing on location device 104 may receive and display this interaction information in interface 300, such as shown in FIG. 3. In some embodiments, location device 104 may only receive the interaction identifier and location interface application 122 may call remote server 104 for details to create interface 300 using the interaction identifier. When user 126 wants to send a notification to user 110, user 126 may select an option to send the notification, such as shown in FIG. 3, which may present user 126 with interface 400 for preparing, creating, and/or generating the notification, as shown in FIG. 4. The notification may be an offer, such as a sale offer or an upselling offer, or an offer for credit at the location. The notification may be an advertisement. The notification may also be a receipt or bill of sale, or a notification that an order is ready for pickup.

Once the notification is ready, it may be sent along with the interaction identifier to remote server 106. Based on the interaction identifier, remote server 106 may look up user and/or user device associated or mapped to the interaction identifier. Remote server 106 may then check the notification against one or more user-defined and/or system-defined rules. In some embodiments, user 110 may be able to specify the type of notifications that will be received on user device 102, the timing of such notifications, and the like. Such settings may be stored in account information 134 of account database 132. Remote server 106 may also have system-defined rules that may limit the type and content of notifications that will be pushed to users. When the received notification is determined to be acceptable based on the user-defined and system-defined rules, remote server 106 will push the notification to user device 102 where it may be received by at least one of browser application 112, check in application 114, and payment application 116, and displayed by display component 210 of user device 102. Since user 110 already has installed these applications on user device 102, user 110 will be able to receive notifications pushed from remote server 106 on behalf of a user 126 without needing to install additional applications specific to the location or providing personal contact information to the location.

Figure 6:
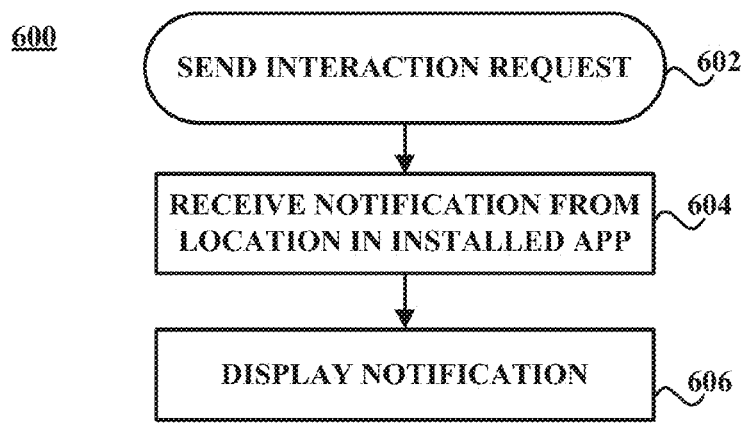
FIG. 6 is a flowchart illustrating a process for receiving notifications from a location with which a user is interacting, consistent with some embodiments.

FIG. 6 is a flowchart illustrating a process 600 for receiving notifications from a location with which a user is interacting, consistent with some embodiments. For the purpose of illustration, FIG. 6 may be described with reference to any of FIGS. 1-5. Process 600 shown in FIG. 6 may be embodied in computer-readable instructions for execution by one or more processors such that one or more of the steps of the method may be performed by processing component 206 of user device 102. As shown in FIG. 6, process 600 may begin when user device 102 sends an interaction request (602). In some embodiments, user 110 may interact with browser application 112, check in application 114, or payment application 116 installed on user device 102 to send a request to remote server 106 to interact with a location or merchant. In some embodiments, the request may be automatically sent to remote server 106 based on instructions in an application installed on user device 102 and executed by processing component 206 in response to a setting for automatic interactions at a location, the automatic interactions being facilitated by Bluetooth®, BLE, NFC, and the like. Moreover, the interaction request may be a request to check in, a request to transact and may include payment information, for example information for authorizing a payment to complete an order.

User device 102 may receive a notification from remote server 106 (604). In some embodiments, the received notification may be a receipt, an offer or advertisement, an indication that an order is ready, and the like, and may be received by an installed application such as browser application 112, check in application 114, or payment application 116. Moreover, the received notification may be from the location or merchant with which user 110 was interacting with through remote server 106. Applications installed on user device 102 may include instructions that when executed by processing component 206 causes the notification to be displayed by display component 210 of user device 102 (606). In some embodiments, user 110 may be able to set rules, settings, and preferences for receiving notifications using user device 102. Such settings and preferences may be set in a settings feature of browser application 112, check in application 114, or payment application 116 by user 110 and may be provided to remote server 104 where they may be stored in account information 134 of account database 132. The settings and rules may determine the types of notifications that user 110 permits to be pushed to user device 102 as well as the timings of the notifications.

Figure 7:
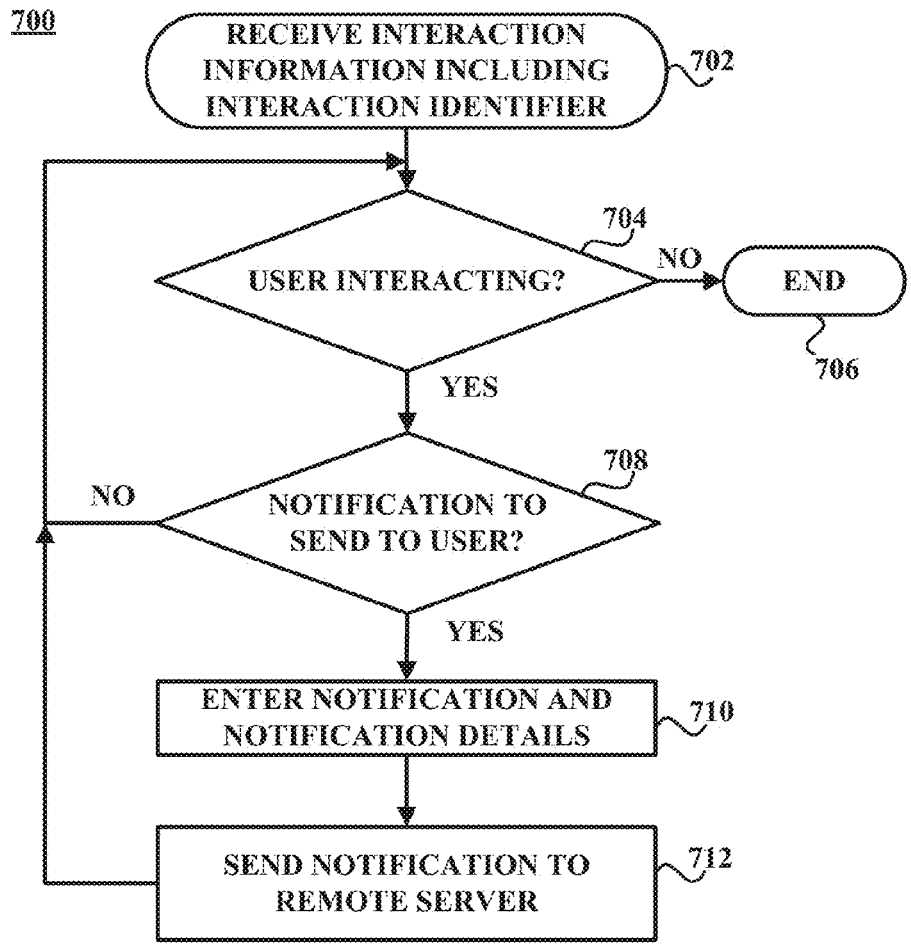
FIG. 7 is a flowchart illustrating a process for sending notifications to an interacting user using a remote server as a proxy, consistent with some embodiments.

FIG. 7 is a flowchart illustrating a process 700 for sending notifications to an interacting user using remote server 106 as a proxy, consistent with some embodiments. For the purpose of illustration, FIG. 7 may be described with reference to any of FIGS. 1-5. Process 700 shown in FIG. 7 may be embodied in computer-readable instructions for execution by one or more processors such that one or more of the steps of the method may be performed by processing component 206 of merchant device 104. As shown in FIG. 7, process 700 may begin when location device 104 receives interaction information including an interaction identifier from remote server 104 indicative of user 110 interacting with the merchant or location via remote server 104 (702). In some embodiments, location interface application 122 may include instructions that, when executed by processing component 206 of location device 104, causes interface 300 to be displayed by display component 210 of location device 104. Interface 300 may show display information related to the interaction of a user with the merchant or location.

User 126 may monitor interface 300 and may view the interaction information and take other actions while a user interaction is valid (704), but may not be able to take any actions when user 110 is no longer actively interacting with the location through remote server 104, or such interaction has expired based on an expiration period set by user, remote server 104, and/or the location (706). In some embodiments, user 126 may want to send a notification to user 110 (708). This may be effected, for example, by selecting a send message button in interface 300, including in individual entries 302 or 304 for user 110 or 306. User 126 may then be provided with interface 400 where user 126 may be able to create the notification and enter notification details (710). In some embodiments, the notification details may include a type of notification 402, a time period associated with delivery of the notification 404, and additional text 406 associated with the notification. Once the notification is ready to be sent to user 110, location interface application 122 of location device 104 may be configured to send the notification to remote server 106 over network 108 (712). In some embodiments, the notification may be sent to remote server 106 along with the interaction identifier. Remote server 106 may then act push the notification to user device 102 through an application installed on user device 102 associated with remote server 104, such as browser application 112, check in application 114, or payment application 116.

Figure 8:
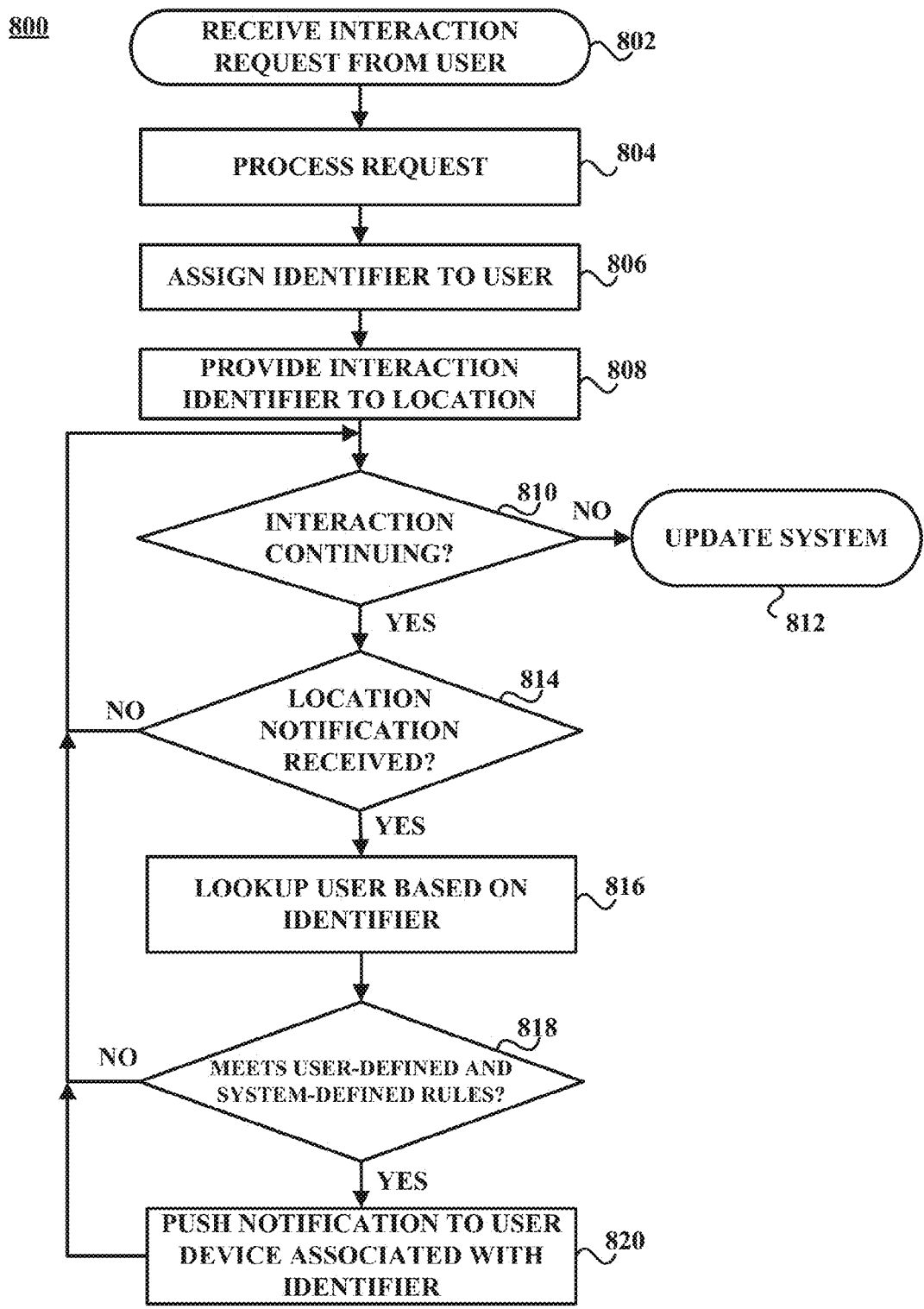
FIG. 8 is a flowchart illustrating a process for pushing a notification to an interacting user as a proxy for a merchant or location, consistent with some embodiments.

FIG. 8 is a flowchart illustrating a process 800 for pushing a notification to an interacting user as a proxy for a merchant or location, consistent with some embodiments. For the purpose of illustration, FIG. 8 may be described with reference to any of FIGS. 1-5. Process 800 shown in FIG. 8 may be embodied in computer-readable instructions for execution by one or more processors such that one or more of the steps of the method may be performed by processing component 206 of remote server 106. As shown in FIG. 8, process 800 includes remote server 106 receiving an interaction request from user 110 (802). In some embodiments, the interaction request may include information sufficient for use be remote server 106 to perform an action consistent with the request. Such information may include a user id or user name, password, or other credentials, a location identification, provided by GPS or other identifier. The information may be provided to remote server 106 automatically facilitated by one or more beacons or dongles communicating with user device 102 over a Bluetooth®, BLE, or NFC communications protocol.

Remote server 106 may then process the check in (804). In some embodiments, remote server 106 may use the information received along with the request to authenticate user 110 and user device 102 to remote server 106. Such authentication may include matching received information to information stored in account information 134 of account database 132 and may allow user 110 to interact with a merchant or location through remote server 104. Processing the request may also include looking up location information related to location information received as part of the request. Remote server 106 may then assign an interaction identifier to user 110 and/or user device 102 and the requested interaction (806). This interaction identifier may be associated with an account of user 110 in account information 134. Remote server 106 may then provide interaction information including the interaction identifier to location device 104 (808). In some embodiments, check in application 128 or payment application 130 may interface with location interface application 122 such that interface 300 shows users that are currently interacting with the location, including user 110, along with the relevant interaction information. Moreover, remote server 106 may monitor the user interaction and, in some embodiments, monitor an expiration time associated with the interaction, which may be between 1-3 hours, for example and, in some examples, may be about 2 hours. When user 110 is determined to no longer be interacting with the location or merchant, whether by expiration or signing out or similar (810), remote server 104 may update the system (812), which may then provide an indication to location device 104 such that the interaction information is no longer viewable in interface 300.

While user 110 interaction continues, remote server 106 may receive a notification from location device 104 to push to user device 102 (814). The notification may include the interaction identifier. The notification also may include notification details, such as a notification type, delivery time, notification text, images, links, and the like. Processing component 206 of remote server 106 may then lookup the user and/or user device based on the interaction identifier provided by location device 104 (816). When the user and/or user device 102 has been located, remote server 106 may then determine whether the notification meets user-defined and system-defined rules for notifications (818). In some embodiments, the user-defined and system-defined rules may specify what types of notifications are permitted, how long after check in they should be sent, times of day at which they should not be sent, and the like. When the notification meets the user-defined and system-defined rules, remote server 106 may push the notification to the device associated with the interaction identifier. As a result, user 126 may be able to push notifications to a user interacting with the location or merchant through remote server 106 using remote server 106 as a proxy.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described herein may allow a merchant or location to send notifications to a device of a user interacting with the merchant or location through a third party through one or more applications installed on the user device that are associated with the third party and used for the interaction. In particular, embodiments described herein may assign the user and/or user device a specific interaction identifier associated with the user and/or user device and the interaction that may be used by the third party to send certain notifications on behalf of the merchant or location. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system comprising:
a non-transitory memory; and
one or more hardware processors coupled to the non-transitory memory and configured to read instructions from the non-transitory memory to cause the system to perform operations comprising:
receiving an interaction request from a first client device through a network, wherein the interaction request identifies a second client device;
assigning an identifier to the interaction request, wherein the identifier is configured to identify the first client device to the system, and wherein the identifier does not include information that identifies the first client device to the second client device;
providing the identifier to the second client device through the network;
receiving, from the second client device through the network, a communication that includes the identifier;
identifying the first client device as a recipient of the communication based on the identifier; and
providing the communication to the first client device through the network in response to identifying the first client device as the recipient.

2. The system of claim 1, wherein the operations further comprise:
identifying the second client device as a target of the interaction request;
wherein the providing the identifier to the second client device comprises providing the interaction request to the second client device;
wherein the communication is received from the second client device in response to the interaction request; and
wherein in response to the providing the communication to the first client device, the first client device is configured to invoke one or more applications of the first client device that include a payment application, a browser application, or a security application.

3. The system of claim 1, wherein the operations further comprise:
beginning, in response to receiving the interaction request, an interaction session associated with the identifier; and
determining, in response to identifying the first client device as the recipient of the communication based on the identifier, that the interaction session has not expired, and in response, providing the communication to the first client device.

4. The system of claim 1, wherein the operations further comprise:
applying at least one rule to the communication, wherein the communication is provided to the first client device in response to the at least one rule allowing the communication to be provided to the first client device.

5. The system of claim 4, wherein the operations further comprise:
receiving, from the first client device through the network prior to receiving the interaction request, the at least one rule that includes one of 1) a type of the communication that is allowed to be provided to the first client device, or 2) a time period that the communication is allowed to be provided to the first client device.

6. The system of claim 4, wherein the operations further comprise:
retrieving from a memory, prior to receiving the interaction request, the at least one rule that includes at least one system-defined rule that defines one of 1) a type of the communication that is allowed to be provided to client devices, or 2) a content of the communication that is allowed to be provided to the client devices.

7. The system of claim 1, wherein the operations further comprise:
determining a type of the interaction request, wherein the type of the interaction request includes at least one of a transaction interaction request or a check-in interaction request; and
providing, to the second client device through the network, the type of the interaction request along with the identifier.

8. A non-transitory machine-readable medium having stored thereon machine-readable instructions executable to cause a machine to perform operations comprising:
receiving an interaction request from a first client device through a network, wherein the interaction request identifies a second client device;
assigning an identifier to the interaction request, wherein the identifier is configured to identify the first client device to the machine, and wherein the identifier does not include information that identifies the first client device to the second client device;
providing the identifier to the second client device through the network;
receiving, from the second client device through the network, a communication that includes the identifier;
identifying the first client device as a recipient of the communication based on the identifier; and
providing the communication to the first client device through the network in response to identifying the first client device as the recipient.

9. The non-transitory machine-readable medium of claim 8, wherein the operations further comprise:
identifying the second client device as a target of the interaction request;
wherein the providing the identifier to the second client device comprises providing the interaction request to the second client device;
wherein the communication is received from the second client device in response to the interaction request; and
wherein in response to the providing the communication to the first client device, the first client device is configured to invoke one or more applications of the first client device that include a payment application, a browser application, or a security application.

10. The non-transitory machine-readable medium of claim 8, wherein the operations further comprise:
beginning, in response to receiving the interaction request, an interaction session associated with the identifier; and
determining, in response to identifying the first client device as the recipient of the communication based on the identifier, that the interaction session has not expired, and in response, providing the communication to the first client device.

11. The non-transitory machine-readable medium of claim 8, wherein the operations further comprise:
applying at least one rule to the communication, wherein the communication is provided to the first client device in response to the at least one rule allowing the communication to be provided to the first client device.

12. The non-transitory machine-readable medium of claim 11, wherein the operations further comprise:
receiving, from the first client device through the network prior to receiving the interaction request, the at least one rule that includes one of 1) a type of the communication that is allowed to be provided to the first client device, or 2) a time period that the communication is allowed to be provided to the first client device.

13. The non-transitory machine-readable medium of claim 11, wherein the operations further comprise:
retrieving from a memory, prior to receiving the interaction request, the at least one rule that includes at least one system-defined rule that defines one of 1) a type of the communication that is allowed to be provided to client devices, or 2) a content of the communication that is allowed to be provided to the client devices.

14. The non-transitory machine-readable medium of claim 8, wherein the operations further comprise:
determining a type of the interaction request, wherein the type of the interaction request includes at least one of a transaction interaction request or a check-in interaction request; and
providing, to the second client device through the network, the type of the interaction request along with the identifier.

15. A proxied communication method, comprising:
receiving, by a proxy server system, an interaction request from a first client device through a network, wherein the interaction request identifies a second client device;
assigning, by the proxy server system, an identifier to the interaction request, wherein the identifier is configured to identify the first client device to the proxy server system, and wherein the identifier does not include information that identifies the first client device to the second client device;
providing, by the proxy server system and through the network, the identifier to the second client device;
receiving, by the proxy server system from the second client device through the network, a communication that includes the identifier;
identifying, by the proxy server system, the first client device as a recipient of the communication based on the identifier; and
providing, by the proxy server system, the communication to the first client device through the network in response to identifying the first client device as the recipient.

16. The method of claim 15, further comprising:

beginning, by the proxy server system in response to receiving the interaction request, an interaction session associated with the identifier; and determining, by the proxy server system in response to identifying the first client device as the recipient of the communication based on the identifier, that the interaction session has not expired, and in response, providing the communication to the first client device.

17. The method of claim 15, further comprising:

applying, by the proxy server system, at least one rule to the communication, wherein the communication is provided to the first client device in response to the at least one rule allowing the communication to be provided to the first client device.

18. The method of claim 17, further comprising:

receiving, by the proxy server system from the first client device through the network prior to receiving the interaction request, the at least one rule that includes one of 1) a type of the communication that is allowed to be provided to the first client device, or 2) a time period that the communication is allowed to be provided to the first client device.

19. The method of claim 17, further comprising:

retrieving from a memory, by the proxy server system prior to receiving the interaction request, the at least one rule that includes at least one system-defined rule that defines one of 1) a type of the communication that is allowed to be provided to client devices, or 2) a content of the communication that is allowed to be provided to the client devices.

20. The method of claim 15, further comprising:

determining, by the proxy server system, a type of the interaction request, wherein the type of the interaction request includes at least one of a transaction interaction request or a check-in interaction request; and providing, by the proxy server system to the second client device through the network, the type of the interaction request along with the identifier.

\* \* \* \* \*